United States Patent
Liang et al.

(10) Patent No.: US 12,275,197 B2
(45) Date of Patent: Apr. 15, 2025

(54) DEVICE AND METHOD FOR FORMING V-SHAPED FULL-COMPOSITE PRESSURE VESSEL

(71) Applicant: Taiyuan University of Technology, Taiyuan (CN)

(72) Inventors: Jianguo Liang, Taiyuan (CN); Qingxue Huang, Taiyuan (CN); Zemin Ning, Taiyuan (CN); Yuqin Xue, Taiyuan (CN); Zhaotun Jia, Taiyuan (CN); Jianglin Liu, Taiyuan (CN); Yujie Duan, Taiyuan (CN); Hui Li, Taiyuan (CN); Lianyun Jiang, Taiyuan (CN); Zhi Li, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/796,627

(22) Filed: Aug. 7, 2024

(65) Prior Publication Data

US 2025/0074012 A1    Mar. 6, 2025

(30) Foreign Application Priority Data

Aug. 28, 2023    (CN) .......................... 202311084666.5

(51) Int. Cl.
*B29C 70/32*    (2006.01)
*B29C 53/56*    (2006.01)
(Continued)

(52) U.S. Cl.
CPC .............. *B29C 70/32* (2013.01); *B29C 53/56* (2013.01); *B29C 53/80* (2013.01); *B29C 70/342* (2013.01); *B29L 2031/7156* (2013.01)

(58) Field of Classification Search
CPC .......... B29L 2031/7156; B29C 70/342; B29C 53/80; B29C 53/56; B29C 70/32
See application file for complete search history.

(56) References Cited

U.S. PATENT DOCUMENTS 6,361,635 B1 *    3/2002   Ayorinde .............. B29C 53/602
                                                                156/169

FOREIGN PATENT DOCUMENTS

| CN | 104999674 A | 10/2015 |
| CN | 115122668 A | 9/2022 |

OTHER PUBLICATIONS

Machine translation of CN 104999674 A; Publication Date: Oct. 28, 2015; Inventor: Zhao Hongbin.*

(Continued)

*Primary Examiner* — Vishal I Patel
(74) *Attorney, Agent, or Firm* — HAUPTMAN HAM, LLP

(57) ABSTRACT

A device for forming a V-shaped full-composite pressure vessel includes a semi-cylinder body mold, where the length of a cylinder body part of the semi-cylinder body mold is half of the length of a cylinder body of a processed pressure vessel; a groove for placing a valve seat is reserved at one end of a dome part of the semi-cylinder body mold, and a fiber yarn-dividing ring is mounted at the other end; the semi-cylinder body mold is connected to the valve seat through a spline; and the valve seat and the fiber yarn-dividing ring are in threaded connection with a rotating shaft of fiber winding equipment. According to this disclosure, a liner-free pressure vessel can be manufactured completely by processing a composite material, so the mass of the pressure vessel can be reduced. Furthermore, the mold is not required to be dissolved and taken out.

9 Claims, 5 Drawing Sheets

(51) Int. Cl.
*B29C 53/80* (2006.01)
*B29C 70/34* (2006.01)
*B29L 31/00* (2006.01)

(56) References Cited

OTHER PUBLICATIONS

Mahcine translation of CN 1151226684 A: Publicaiton date: Sep. 30, 2022; Inventor: Zhizhong Yang.*
Machine translation of CN 104999674A (Year: 2015).*
Machine translation of CN115122668A (Year: 2022).*
First Office Action with Search Report issued in Chinese Application No. 202311084666.5; mailed Oct. 8, 2023; 17 pgs.
Notification to Grant Patent Right for Invention issued in Chinese Application No. 202311084666.5; mailed Oct. 19, 2023; 5 pgs.

* cited by examiner

DEVICE AND METHOD FOR FORMING V-SHAPED FULL-COMPOSITE PRESSURE VESSEL

RELATED APPLICATIONS

The present application claims priority from Chinese Application Number CN202311084666.5 filed Aug. 28, 2023, the disclosure of which is hereby incorporated by reference herein in its entirety.

TECHNICAL FIELD

The present invention relates to the field of processing and forming of special equipment, and in particular to a device and method for forming a V-shaped full-composite pressure vessel.

BACKGROUND

A pressure vessel is an important equipment for storing and transporting high-pressure gas and liquid. At present, the development of designing pressure vessels and storage tanks for storing liquid and gases under high pressure has gone through four different stages: full-metal pressure vessel (I type), fiber composite material circumferential winding metal liner (II type), fiber composite material full-winding metal liner (III type) and fiber composite material full-winding plastic liner (IV type), where composite material full-winding pressure vessels are widely used in the fields of aerospace, transportation and the like. Developing a safe, light and efficient pressure vessel has become an important technical requirement of energy storage and transportation. The fifth stage of the pressure vessel, that is, a full-composite material liner-free storage tank (V type), refers to a pressure vessel that does not include any liner and is processed by completely using the composite material, so that the mass of the pressure vessel can be further reduced. However, formation without the liner is a greater challenge. The V-shaped pressure vessels have been regarded as the commanding heights of products and technologies in the pressure vessel industry for a long time. At present, only the United States has designed a commercially available, full-composite material and liner-free pressure vessel. A dissolvable liner mold with the same shape as the pressure vessel is manufactured first, then a fiber composite material is wound on the liner mold, the liner mold is dissolved after the composite material is cured, and the V-shaped pressure vessel is formed. This method is low in forming efficiency and high in cost. Therefore, it is necessary to propose a method for forming a brand-new V-shaped pressure vessel without dissolving a liner mold.

SUMMARY

The present invention aims to manufacture a pressure vessel completely made of composite materials except a valve seat, thereby reducing the mass of the pressure vessel. Furthermore, it is unnecessary to dissolve and take out the mold, so the forming efficiency is improved and the cost is reduced. A device and method for forming a V-shaped full-composite material pressure vessel are provided.

The present invention adopts the following technical solution: a device for forming a V-shaped full-composite pressure vessel includes a semi-cylinder body mold, where the length of a cylinder body part of the semi-cylinder body mold is half of the length of a cylinder body of a processed pressure vessel; a groove for placing a valve seat is reserved at one end of a dome part of the semi-cylinder body mold, and a fiber yarn-dividing ring is mounted at the other end; the semi-cylinder body mold is connected to the valve seat through a spline; and the valve seat and the fiber yarn-dividing ring are in threaded connection with a rotating shaft of fiber winding equipment.

In some embodiments, yarn-dividing combs are distributed in a circumferential direction of the fiber yarn-dividing ring in an array manner, the fiber yarn-dividing ring is circumferentially fixed on an inner side of the semi-cylinder body mold, and a threaded hole is processed in the axial direction of the fiber yarn-dividing ring and connected to the rotating shaft of the fiber winding equipment.

In some embodiments, a through hole is processed in the circumferential direction of the fiber yarn-dividing ring, a threaded blind hole is formed at a position corresponding to the inner side of the cylinder body of the semi-cylinder body mold, a bolt is formed in the through hole, and the through hole is fixedly connected to the threaded blind hole at the inner side of the cylinder body of the semi-cylinder body mold.

A method for forming a V-shaped full-composite pressure vessel adopts the device for forming a V-shaped full-composite pressure vessel, and includes the following steps.

S100: processing the semi-cylinder body mold and the fiber yarn-dividing ring of the pressure vessel according to the structure size of the pressure vessel, and connecting the semi-cylinder body mold and the fiber yarn-dividing ring;

S200: placing the valve seat in the groove of the dome of the semi-cylinder body mold, respectively fixing the valve seat and the fiber yarn-dividing ring on the rotating shaft, spray-coating the surface of the semi-cylinder body mold with a releasing agent, and winding a composite material thin layer through the fiber winding equipment;

S300: putting the semi-cylinder body mold and the composite material thin layer into curing equipment to perform composite material curing, and taking down the valve seat and a cured semi-cylinder body composite material thin layer after a composite material is cured;

S400: repeating the steps S200 and S300, processing the other semi-cylinder body composite material thin layer, and spraying-coating inner walls of the two semi-cylinder body composite material thin layers respectively with anti-corrosive and impermeable coatings;

S500: connecting the two semi-cylinder body composite material thin layers to form a full-cylinder body composite material thin layer; and S600: performing full fiber winding and composite material curing on the full-cylinder body composite material thin layer to finally obtain the full-composite material pressure vessel meeting requirements.

In the step S100, the valve seat is connected to an external protective sleeve by reserving an external thread, and the external protective sleeve is made of a rubber material.

In the step S200, the spacing distance of the yarn-dividing combs of the fiber yarn-dividing ring is selected according to the width of the wound fiber yarn bundle, the spacing distance of the yarn-dividing combs is equal to the width of the wound fiber yarn bundle, and the spirally wound fiber yarn bundle is spaced by the fiber yarn-dividing ring.

The number of winding layers of the composite material thin layer is calculated by the following formula:

$$t_0 = \frac{t_{f\alpha} + t_{f\theta}}{5} \times \frac{1}{t_{f\alpha 1}}$$

In the formula, $t_0$ is the number of winding layers of the composite material thin layer, $t_{f\alpha}$ is the thickness of a spirally wound layer of a cylinder body section, $t_{f\theta}$ is the thickness of a circumferentially wound layer of the cylinder body section, and $t_{f\alpha 1}$ is the single-layer thickness of spirally wound fibers.

In the step S300, after the composite material is cured, the valve seat and the composite material thin layer are connected through resin, the redundant fiber composite material on the fiber yarn-dividing ring is removed along a connecting groove of the semi-cylinder body mold and the fiber yarn-dividing ring, and the valve seat and the semi-cylinder body composite material thin layers are taken out from the cylinder body to the dome.

In the step S500, firstly, connecting surfaces of the two semi-cylinder body composite material thin layers are ground into wedge shapes, then the connecting surfaces of the semi-cylinder body composite material thin layers are treated by surfactants, and finally, the two semi-cylinder body composite material thin layers are connected to form the full-cylinder body composite material thin layer through gluing.

In the step S600, before the full-cylinder body composite material thin layer is subjected to full fiber winding and composite material curing, an inflatable elastic material gas bag is added into the full-cylinder body composite material thin layer first, and a safety gas is inflated into the elastic material gas bag, so that the elastic material gas bag serves as auxiliary support of the full-cylinder body composite material thin layer; and the elastic material gas bag is kept under pressure in the full fiber winding process and the composite material curing process, and after the composite material curing is completed, the elastic material gas bag is vacuumized and the elastic material gas bag is taken out.

In the step S600, the number of full fiber winding layers is calculated by the following formula:

$$\begin{cases} \alpha = \sin^{-1}\dfrac{r_0}{R} \\ t_{f\alpha} = \dfrac{RP_b}{2K\sigma_{max}\cos^2\alpha} \\ t_{f\theta} = \dfrac{RP_b}{2\sigma_{max}}(2 - \tan^2\alpha) \\ m = \dfrac{t_{f\alpha}}{t_{f\alpha 1}} \\ n = \dfrac{t_{f\theta}}{t_{f\theta 1}} \end{cases}$$

In the formula, m is the number of spirally wound layers, n is the number of circumferentially wound layers, $t_{f\alpha 1}$ is the single-layer thickness of the spirally wound fibers, $t_{f\theta 1}$ is the single-layer thickness of circumferentially wound fibers, $t_{f\alpha}$ is the thickness of the spirally wound layers of the cylinder body section, $t_{f\theta}$ is the thickness of circumferentially wound layers of the cylinder body section, R is the outer contour radius of the semi-cylinder body mold, $P_b$ is a designed bursting pressure of the pressure vessel, K is a fiber strength utilizing coefficient, $\sigma_{max}$ is a fiber tensile strength, $\alpha$ is a spiral winding angle of the cylinder body section, and $r_0$ is the outer contour radius of the cylinder section of the valve seat.

Compared with the prior art, the present invention provides a device and method for forming a brand-new composite material pressure vessel. According to the present invention, a liner-free pressure vessel can be manufactured completely by processing a composite material, so the mass of the pressure vessel can be reduced. Furthermore, the mold is not required to be dissolved and taken out, so the forming efficiency is improved and the cost is reduced. The device and method are suitable for the forming of V-shaped full-composite pressure vessels with various diameters, lengths and end socket structures.

Figure 1:
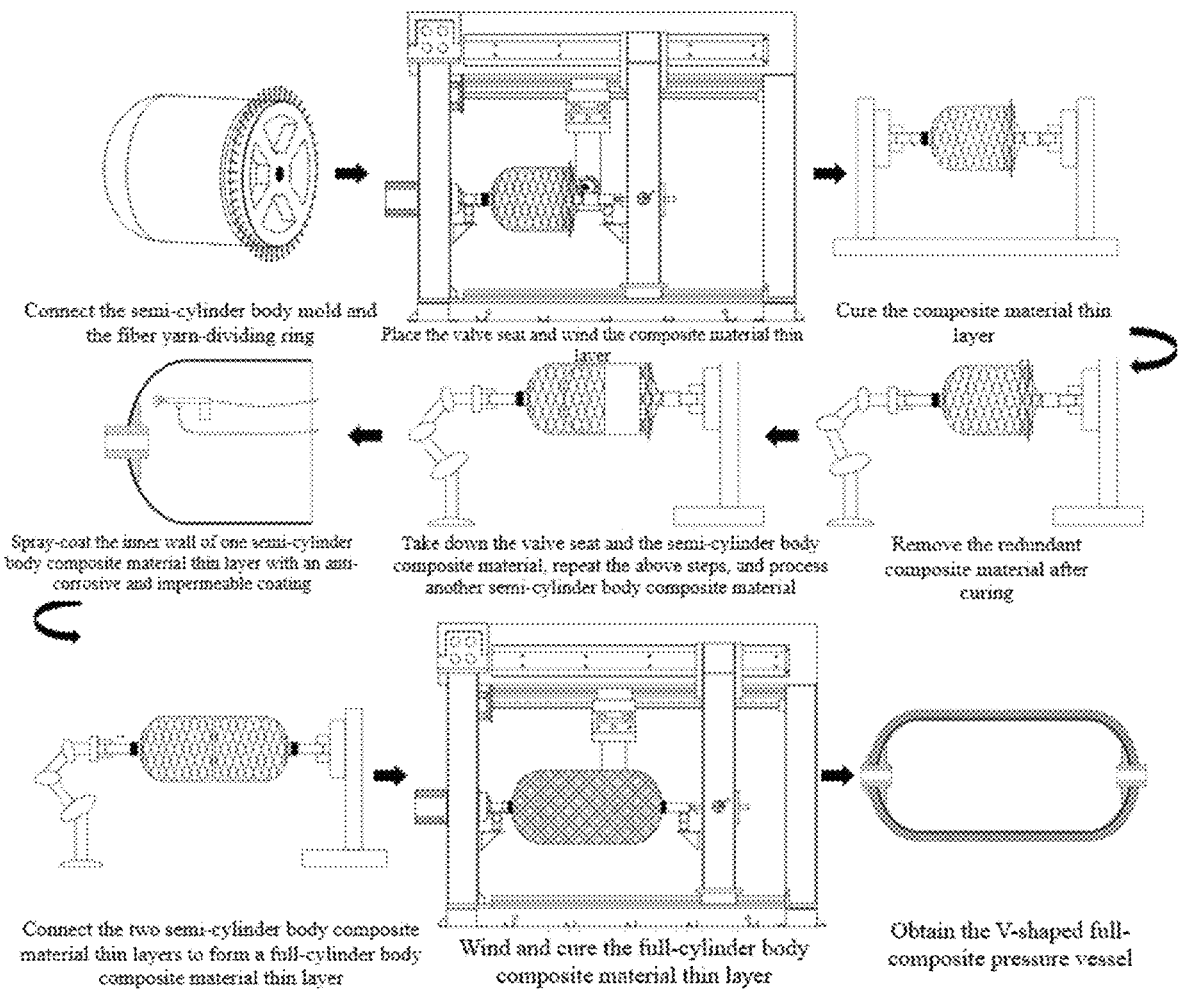
FIG. 1 is a schematic diagram of a method for forming a V-shaped full-composite pressure vessel.

In the drawings: 1. semi-cylinder body mold; 2. valve seat; 3. fiber yarn-dividing ring; 3.1. yarn-dividing comb; 4. composite material thin layer; 4.1. semi-cylinder body composite material thin layer; 4.2. redundant composite material on fiber yarn-dividing ring; 5. cutting cutter; 6. anti-corrosive and impermeable coating; 7. connecting surface; 8. full-cylinder body composite material thin layer; 9. elastic material gas bag; 10. full fiber winding layer; 11. external protective sleeve; 12. rotating shaft.

DETAILED DESCRIPTION OF THE EMBODIMENTS

To make the objectives, technical solutions and advantages of the embodiments of the present invention clearer, the technical solutions in the embodiments of the present invention are described clearly and completely. Apparently, the described embodiments are some rather than all of the embodiments. Based on the embodiments of the present invention, all other embodiments obtained by those of ordinary skill in the art without creative effort belong to the protection scope of the present invention.

Figure 5:
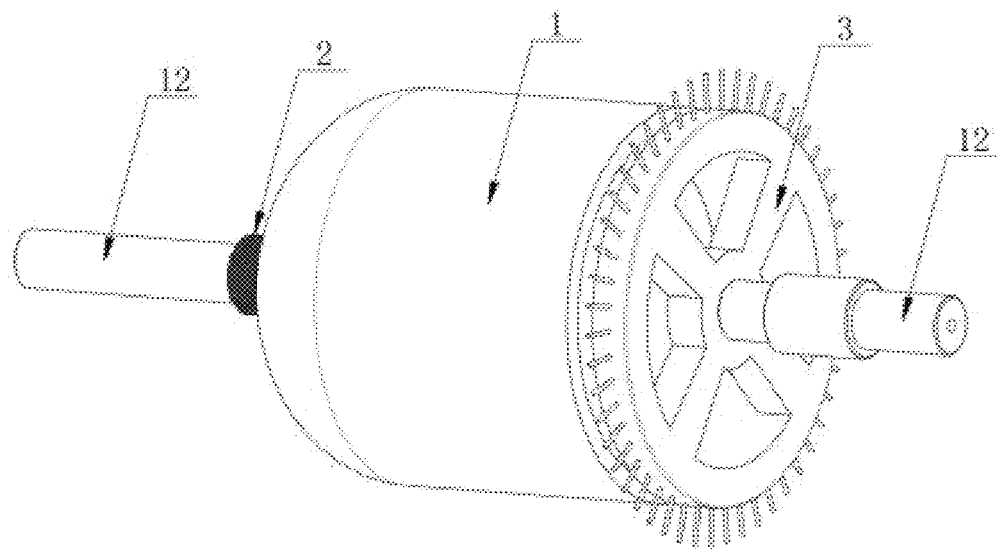
FIG. 5 is a schematic diagram of structural mounting before winding of a composite material thin layer according to the present invention.
Figure 6:
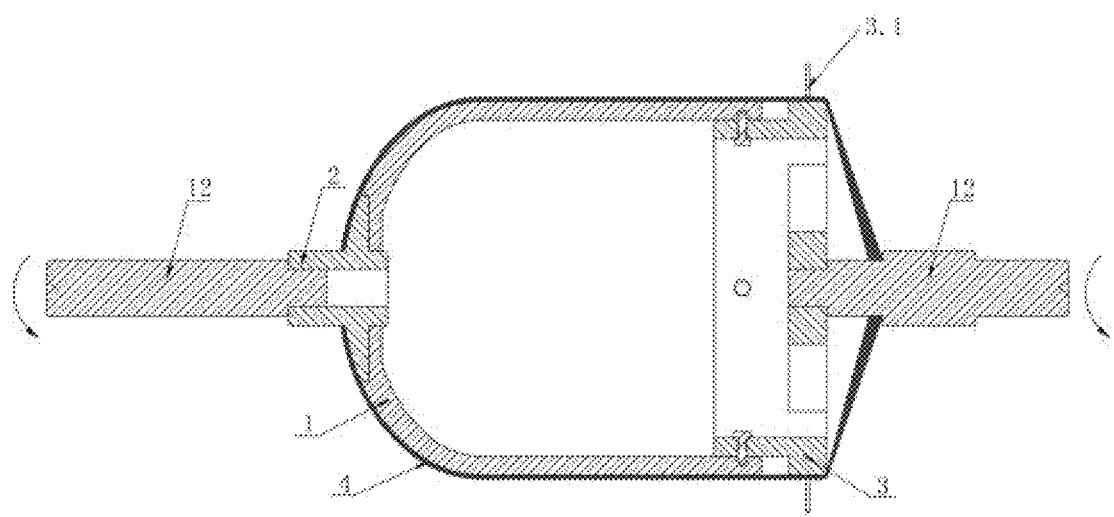
FIG. 6 is a schematic diagram of a winding state of a composite material thin layer according to the present invention.

The present invention provides a device and method for forming a V-shaped full-composite material pressure vessel. As shown in FIG. 5 and FIG. 6, the device includes a semi-cylinder body mold 1, where the length of a cylinder body part of the semi-cylinder body mold 1 is half of the length of a cylinder body of a processed pressure vessel; a groove for placing a valve seat 2 is reserved at one end of a dome part of the semi-cylinder body mold 1, and a fiber yarn-dividing ring 3 is mounted at the other end; the semi-cylinder body mold 1 is connected to the valve seat 2 through a spline; and the valve seat 2 and the fiber yarn-dividing ring 3 are in threaded connection with a rotating shaft 12 of fiber winding equipment.

Yarn-dividing combs 3.1 are distributed in a circumferential direction of the fiber yarn-dividing ring 3 in an array manner, the fiber yarn-dividing ring 3 is circumferentially fixed on an inner side of the semi-cylinder body mold 1, and a threaded hole is processed in the axial direction of the fiber yarn-dividing ring 3 and connected to the rotating shaft 12 of the fiber winding equipment.

A through hole is formed in the circumferential direction of the fiber yarn-dividing ring 3, a threaded blind hole is formed at a position corresponding to the inner side of the cylinder body of the semi-cylinder body mold 1, a bolt is formed in the through hole, and the through hole is fixedly connected to the threaded blind hole at the inner side of the cylinder body of the semi-cylinder body mold 1.

As shown in FIG. 1, the method includes the following steps:

S100: the semi-cylinder body mold 1 and the fiber yarn-dividing ring 3 of the pressure vessel according to the structure size of the pressure vessel, and the semi-cylinder body mold 1 and the fiber yarn-dividing ring 3 are connected.

Figure 2:
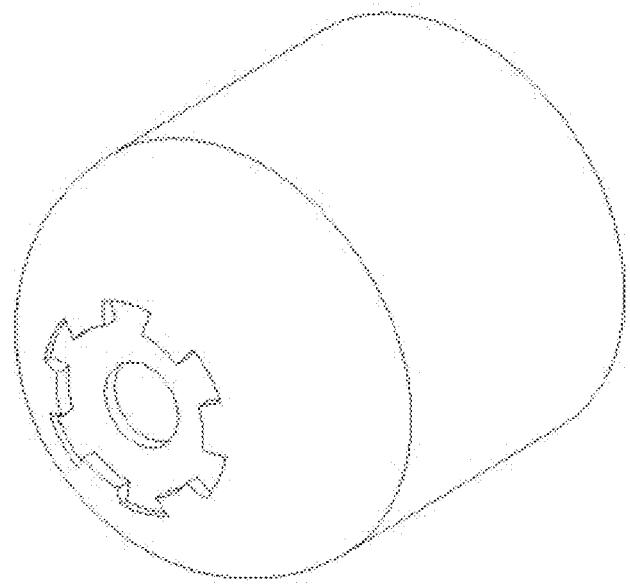
FIG. 2 is a structural schematic diagram of a semi-cylinder body mold according to the present invention.
Figure 3:
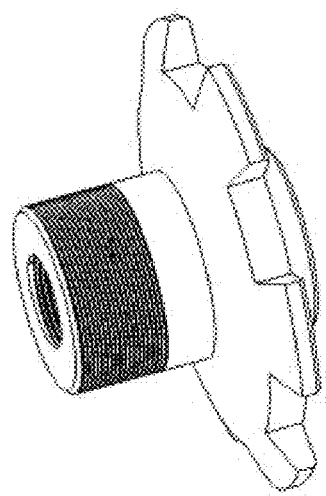
FIG. 3 is a structural schematic diagram of a valve seat according to the present invention.
Figure 4:
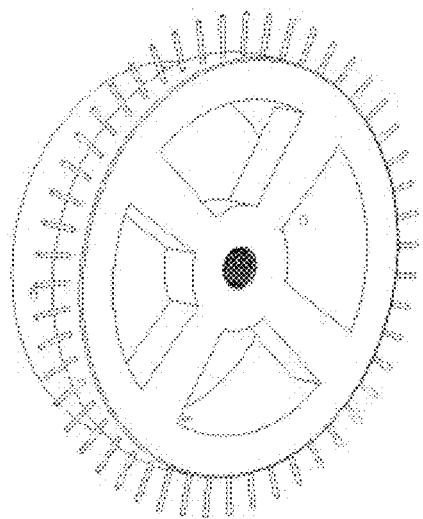
FIG. 4 is a structural schematic diagram of a fiber yarn-dividing ring according to the present invention.

As shown in FIG. 2, in the step S100, the length of a cylinder body part of the semi-cylinder body mold 1 is half of the length of a cylinder body of a processed pressure vessel; a groove for placing a valve seat 2 is reserved at one end of a dome part of the semi-cylinder body mold 1; the semi-cylinder body mold 1 and the valve seat 2 are connected through a spline; the valve seat 2 is in threaded connection with the rotating shaft 12 of the fiber winding equipment; the structure of the valve seat 2 is shown in FIG. 3; the inner side of the cylinder body of the semi-cylinder body mold 1 is provided with a threaded blind hole; as shown in FIG. 4, the fiber yarn-dividing ring 3 is provided with yarn-dividing combs 3.1 in an array manner; the spacing distance of the yarn-dividing combs 3.1 may be selected according to the width of the wound fiber yarn bundle; a through hole is processed in the fiber yarn-dividing ring 3 circumferentially and is in threaded connection with the semi-cylinder body mold 1; and a threaded hole is axially processed in the fiber yarn-dividing ring 3 and can be connected to the rotating shaft 12 of the fiber winding equipment.

S200: as shown in FIG. 5, the valve seat 2 is placed in the groove of the dome of the semi-cylinder body mold 1, the valve seat 2 and the fiber yarn-dividing ring 3 are respectively fixed on the rotating shaft 12, the surface of the semi-cylinder body mold 1 is spray-coated with a releasing agent, and a composite material thin layer 4 is wound through the fiber winding equipment. The spacing distance of the yarn-dividing combs 3.1 of the fiber yarn-dividing ring 3 is selected according to the width of the wound fiber yarn bundle, the spacing distance of the yarn-dividing combs 3.1 is equal to the width of the wound fiber yarn bundle, and the spirally wound fiber yarn bundle is spaced through the fiber yarn-dividing ring 3.

In the step S200, the composite material thin layer 4 is wound through the fiber winding equipment; the wound composite material thin layer 4 refers to a fiber spirally wound layer; and as shown in FIG. 6, the spirally wound fiber yarn bundle is spaced by the fiber yarn-dividing ring 3 and is wound on the rotating shaft 12 connected to the fiber yarn-dividing ring 3.

The number of winding layers of the composite material thin layer 4 is calculated by the following formula:

$$t_0 = \frac{t_{f\alpha} + t_{f\theta}}{5} \times \frac{1}{t_{f\alpha 1}}$$

In the formula, $t_0$ is the number of winding layers of the composite material thin layer, $t_{f\alpha}$ is the thickness of a spiral winding layer of a cylinder body section, $t_{f\theta}$ is the thickness of a circumferential winding layer of the cylinder body section, and $t_{f\alpha 1}$ is the single-layer thickness of spiral winding fibers.

In the winding process of the full fiber winding layer, the fiber winding tension makes the composite material thin layer produce a compression stress. The thicker the full fiber winding layer, the greater the compression stress produced by the composite material thin layer. To ensure that the compression stress does not damage the composite material thin layer, the thickness of the composite material thin layer is designed as one fifth of the thickness of the full fiber winding layer. The composite material thin layer only includes the spirally wound layer and does not include the circumferentially wound layer, and the single-layer thickness of the spirally wound fiber is not equal to the single-layer thickness of the circumferentially wound fiber, so the number of wound layers of the composite material thin layer is equal to one fifth of the thickness of the full fiber winding layer divided by the single-layer thickness of the spirally wound fiber.

S300: the semi-cylinder body mold 1 and the composite material thin layer 4 are put into curing equipment to perform composite material curing.

Figure 7:
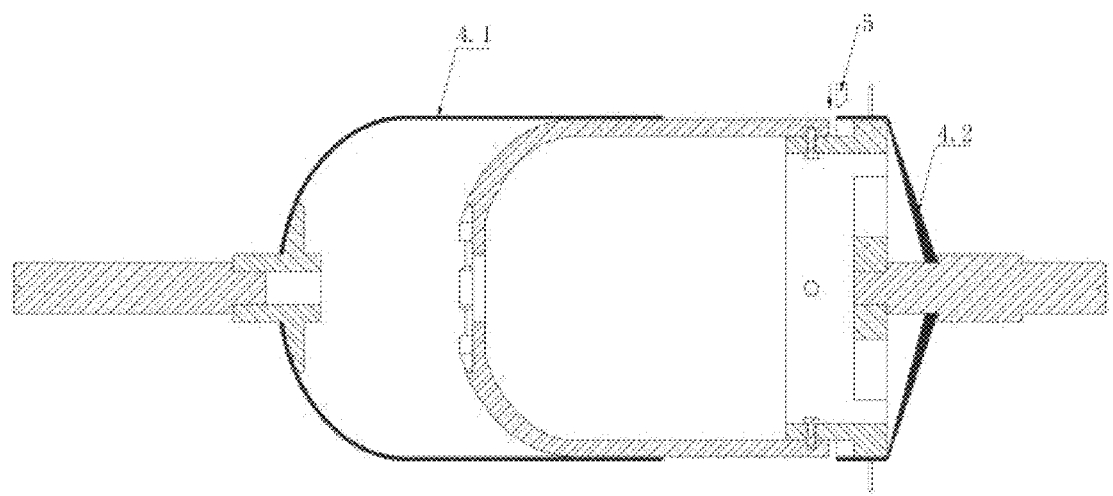
FIG. 7 is a schematic diagram of removing a redundant composite material on a fiber yarn-dividing ring and a schematic diagram of taking out a valve seat and semi-cylinder body composite material thin layers according to the present invention.

As shown in FIG. 7, in the step S300, after the composite material is cured, the valve seat 2 and the composite material thin layer 4 are connected through resin, a redundant fiber composite material 4.2 on the fiber yarn-dividing ring is removed along a connecting groove of the semi-cylinder body mold 1 and the fiber yarn-dividing ring 3, and the valve seat 2 and the semi-cylinder body composite material thin layers 4.1 are taken out from the cylinder body to the dome.

S400: the steps S200 and S300 are repeated, the other semi-cylinder body composite material thin layer 4.1 is processed, and inner walls of the two semi-cylinder body composite material thin layers 4.1 are respectively spray-coated with anti-corrosive and impermeable coatings 6.

Figure 8:
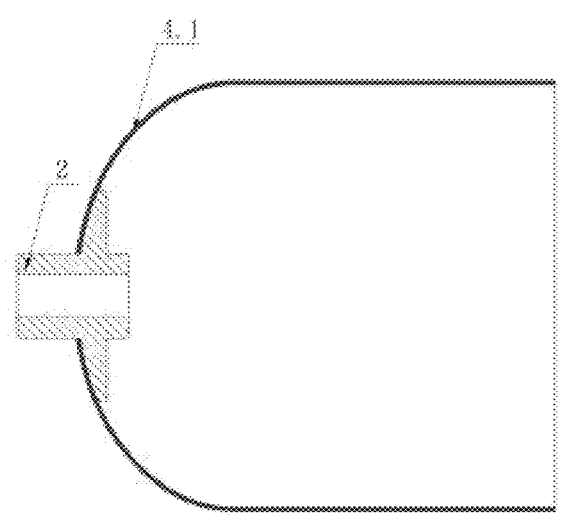
FIG. 8 is a structural schematic diagram of semi-cylinder body composite material thin layers according to the present invention.
Figure 9:
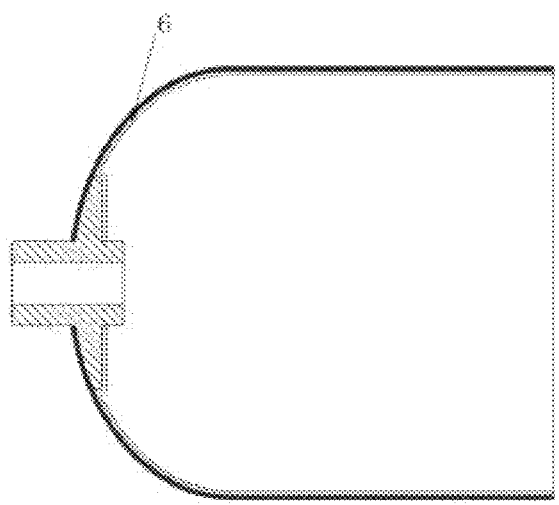
FIG. 9 is a structural schematic diagram of coating an inner wall of semi-cylinder body composite material thin layers with anti-corrosive and impermeable coatings according to the present invention.

The semi-cylinder body composite material thin layer is shown in FIG. 8. The inner wall of the semi-cylinder body composite material thin layer is spray-coated with an anti-corrosive and impermeable coating, as shown in FIG. 9.

S500: the two semi-cylinder body composite material thin layers 4.1 are connected to form a full-cylinder body composite material thin layer 8.

Figure 10:
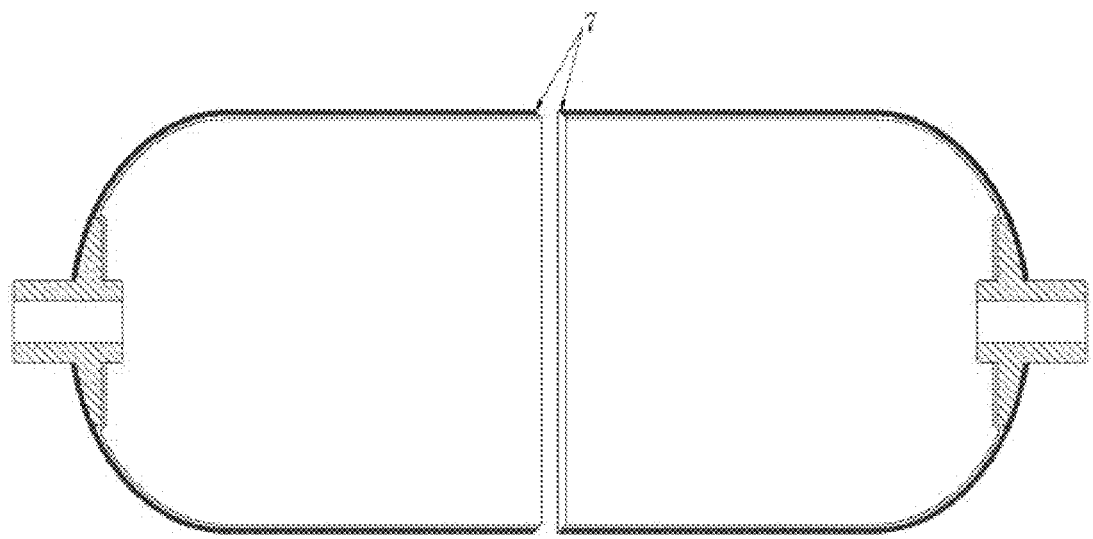
FIG. 10 is a schematic diagram of connection between two semi-cylinder body composite material thin layers according to the present invention.

As shown in FIG. 10, in the step S500, the two semi-cylinder body composite material thin layers 4.1 are connected to form the full-cylinder body composite material thin layer 8. Firstly, connecting surfaces 7 of the two semi-cylinder body composite material thin layers are ground into wedge shapes, then the connecting surfaces 7 of the semi-cylinder body composite material thin layers are treated by surfactants, and finally, the two semi-cylinder body composite material thin layers 4.1 are connected to form the full-cylinder body composite material thin layer 8 through gluing.

Figure 12:
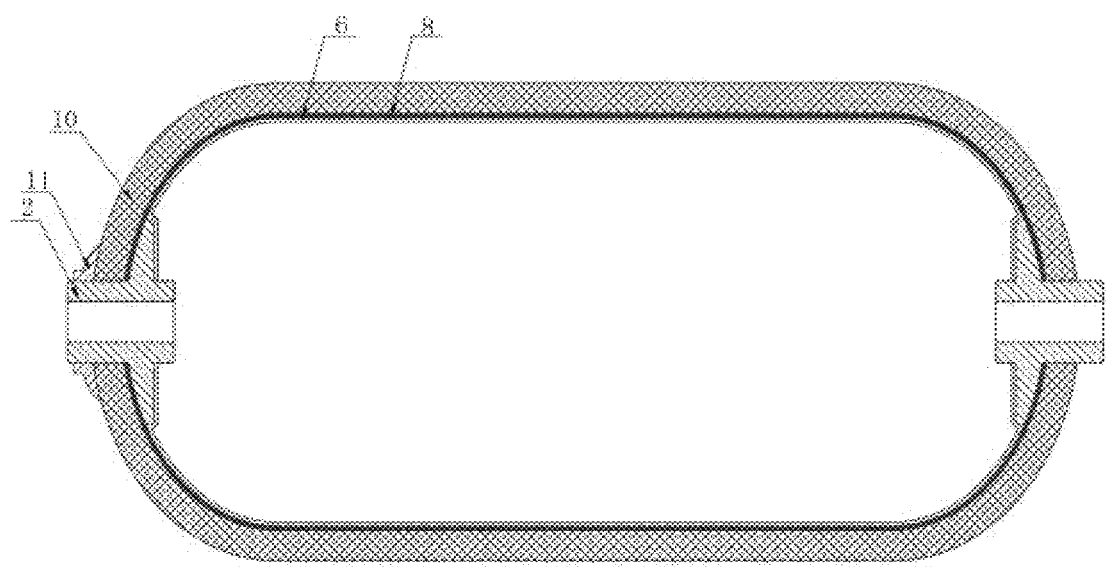
FIG. 12 is a structural schematic diagram of a full-composite material pressure vessel according to the present invention.

S600: full fiber winding and composite material curing are performed on the full-cylinder body composite material thin layer 8 to finally obtain the full-composite material pressure vessel meeting requirements. The structure of the full-composite material pressure vessel is shown in FIG. 12.

Figure 11:
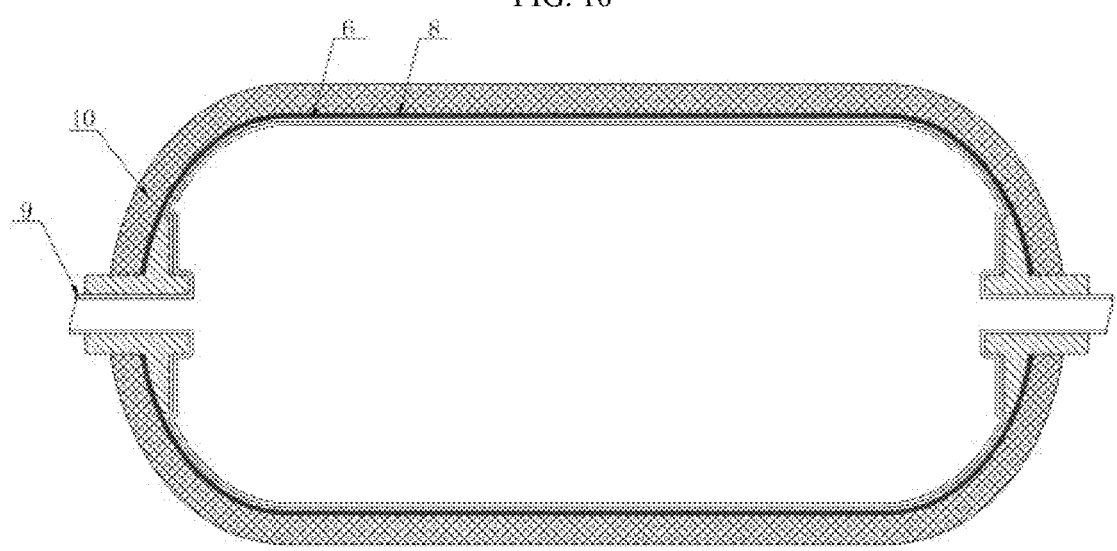
FIG. 11 is a schematic diagram of adding an inflatable and high-temperature-resistant elastic material gas bag in a full-cylinder body composite material thin layer according to the present invention.

As shown in FIG. 11, in the step S600, before the full-cylinder body composite material thin layer 8 is subjected to full fiber winding and composite material curing, an inflatable elastic material gas bag 9 is added into the full-cylinder body composite material thin layer 8 firstly, and a safety gas is inflated into the elastic material gas bag 9, so that the elastic material gas bag 9 serves as auxiliary support of the full-cylinder body composite material thin layer 8; and the elastic material gas bag 9 is kept under pressure in the full fiber winding process and the composite material curing process, and after the composite material curing is completed, the elastic material gas bag 9 is vacuumized and the elastic material gas bag 9 is taken out. The number of the full fiber winding layers of the full-cylinder body composite material thin layer 8 is the number of the spirally wound layer and the number of the circumferentially wound layers required by the designed pressure.

In the step S600, the number of full fiber winding layers is calculated by the following formula:

$$\begin{cases} \alpha = \sin^{-1}\dfrac{r_0}{R} \\ t_{f\alpha} = \dfrac{RP_b}{2K\sigma_{max}\cos^2\alpha} \\ t_{f\theta} = \dfrac{RP_b}{2\sigma_{max}}(2 - \tan^2\alpha) \\ m = \dfrac{t_{f\alpha}}{t_{f\alpha 1}} \\ n = \dfrac{t_{f\theta}}{t_{f\theta 1}} \end{cases}$$

In the formula, m is the number of spirally wound layers, n is the number of circumferentially wound layers, $t_{f\alpha 1}$ is the single-layer thickness of the spirally wound fibers, $t_{f\theta 1}$ is the single-layer thickness of circumferentially wound fibers, $t_{f\alpha}$ is the thickness of the spirally wound layers of the cylinder body section, $t_{f\theta}$ is the thickness of circumferentially wound layers of the cylinder body section, R is the outer contour radius of the semi-cylinder body mold, $P_b$ is a designed bursting pressure of the pressure vessel, K is a fiber strength utilizing coefficient, $\sigma_{max}$ is a fiber tensile strength, $\alpha$ is a spiral winding angle of the cylinder body section, and $r_0$ is the outer contour radius of the cylinder section of the valve seat.

In the step S100, a certain length of external thread is reserved at the valve seat 2 to cooperate with the external protective sleeve 11, and the external protective sleeve 11 is made of a rubber material; and after the full fiber winding and the composite material curing of the full-cylinder body composite material thin layer 8, the full fiber winding layer 10 is obtained, and the external protective sleeve 11 cooperates with the valve seat 2, so that the connection strength and the gas tightness between the valve seat 2 and the full-cylinder body composite material thin layer 8 and the full fiber winding layer 10 can be enhanced.

Finally, it should be noted that the foregoing embodiments are merely intended for describing the technical solutions of the present invention, but not for limiting the present invention. Although the present invention is described in detail with reference to the foregoing embodiments, those of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method for forming a type-V full-composite pressure vessel, using a molding device that includes a half-cylinder body mold in which:
 a length of a cylinder body part of the half-cylinder body mold is half of a length of a cylinder body of the type-V full-composite pressure vessel;
 a groove for placing a valve seat is reserved at one end of a dome part of the half-cylinder body mold, and a fiber yarn-dividing ring is mounted at the other end;
 the half-cylinder body mold is connected to the valve seat through a spline; and
 the valve seat and the fiber yarn-dividing ring are in threaded connection with a rotating shaft of fiber winding equipment;
 the method comprising the following steps:
 S100: processing the half-cylinder body mold and the fiber yarn-dividing ring according to a structure size of the type-V full-composite pressure vessel, and connecting the half-cylinder body mold and the fiber yarn-dividing ring;
 S200: placing the valve seat in the groove of a dome of the half-cylinder body mold, respectively fixing the valve seat and the fiber yarn-dividing ring on the rotating shaft, spray-coating a surface of the half-cylinder body mold with a releasing agent, and winding a composite material thin layer through the fiber winding equipment;
 S300: putting the half-cylinder body mold and the composite material thin layer into curing equipment to perform composite material curing, and taking down the valve seat and a cured half-cylinder body composite material thin layer after a composite material is cured;
 S400: repeating the steps S200 and S300, processing another half-cylinder body composite material thin layer, and spraying-coating inner walls of the two half-cylinder body composite material thin layers respectively with anti-corrosive and impermeable coatings;
 S500: connecting the two half-cylinder body composite material thin layers to form a full-cylinder body composite material thin layer; and
 S600: performing full fiber winding and composite material curing on the full-cylinder body composite material thin layer to finally obtain the type-V full-composite pressure vessel.

2. The method for forming the type-V full-composite pressure vessel according to claim 1, wherein in the step S100, the valve seat is connected to an external protective sleeve by reserving an external thread, and the external protective sleeve is made of a rubber material.

3. The method for forming the type-V full-composite pressure vessel according to claim 1, wherein in the step S200, a number of winding layers of the composite material thin layer is calculated by the following formula:

$$t_0 = \frac{t_{f\alpha} + t_{f\theta}}{5} \times \frac{1}{t_{f\alpha 1}}$$

wherein, in the formula,
$t_0$ is the number of winding layers of the composite material thin layer,
$t_{f\alpha}$ is a thickness of a spirally wound layer of a cylinder body section,
$t_{f\theta}$ is a thickness of a circumferentially wound layer of the cylinder body section, and
$t_{f\alpha 1}$ is a single-layer thickness of spirally wound fibers.

4. The method for forming the type-V full-composite pressure vessel according to claim 1, wherein in the step S300, after the composite material is cured, the valve seat and the composite material thin layer are connected through resin, a redundant fiber composite material on the fiber yarn-dividing ring is removed along a connecting groove of the half-cylinder body mold and the fiber yarn-dividing ring, and the valve seat and the half-cylinder body composite material thin layers are taken out from the cylinder body to the dome.

5. The method for forming the type-V full-composite pressure vessel according to claim 1, wherein in the step S500, firstly, connecting surfaces of the two half-cylinder body composite material thin layers are ground into wedge shapes, then the connecting surfaces of the half-cylinder body composite material thin layers are treated by surfactants, and finally, the two half-cylinder body composite material thin layers are connected to form the full-cylinder body composite material thin layer through gluing.

6. The method for forming the type-V full-composite pressure vessel according to claim 1, wherein in the step S600, before the full-cylinder body composite material thin layer is subjected to full fiber winding and composite material curing, an inflatable elastic material gas bag is added into the full-cylinder body composite material thin layer firstly, and a safety gas is inflated into the elastic material gas bag, so that the elastic material gas bag serves as auxiliary support of the full-cylinder body composite material thin layer; and
the elastic material gas bag is kept under pressure in the full fiber winding process and the composite material curing process, and after the composite material curing is completed, the elastic material gas bag is vacuumized and the elastic material gas bag is taken out.

7. The method for forming the type-V full-composite pressure vessel according to claim 1, wherein in the step S600, a number of layers of the full fiber winding is calculated by the following formula:

$$\begin{cases} \alpha = \sin^{-1}\dfrac{r_0}{R} \\ t_{f\alpha} = \dfrac{RP_b}{2K\sigma_{max}\cos^2\alpha} \\ t_{f\theta} = \dfrac{RP_b}{2\sigma_{max}}(2 - \tan^2\alpha) \\ m = \dfrac{t_{f\alpha}}{t_{f\alpha 1}} \\ n = \dfrac{t_{f\theta}}{t_{f\theta 1}} \end{cases}$$

wherein, in the formula,
m is a number of spirally wound layers,
n is a number of circumferentially wound layers,
$t_{f\alpha 1}$ is a single-layer thickness of the spirally wound layers,
$t_{f\theta 1}$ is a single-layer thickness of the circumferentially wound layers,
$t_{f\alpha}$ is a thickness of the spirally wound layers of a cylinder body section,
$t_{f\theta}$ is a thickness of the circumferentially wound layers of the cylinder body section,
R is an outer contour radius of the half-cylinder body mold,
$P_b$ is a designed bursting pressure of the type-V full-composite pressure vessel,
K is a fiber strength utilizing coefficient,
$\sigma_{max}$ is a fiber tensile strength,
$\alpha$ is a spiral winding angle of the cylinder body section, and
$r_0$ is an outer contour radius of a cylinder section of the valve seat.

8. The method for forming the type-V full-composite pressure vessel according to claim 1, wherein yarn-dividing combs are distributed in a circumferential direction of the fiber yarn-dividing ring in an array manner, the fiber yarn-dividing ring is circumferentially fixed on an inner side of the half-cylinder body mold, and a threaded hole is processed in an axial direction of the fiber yarn-dividing ring and connected to the rotating shaft of the fiber winding equipment.

9. The method for forming the type-V full-composite pressure vessel according to claim 8, wherein a through hole is processed in the circumferential direction of the fiber yarn-dividing ring, a threaded blind hole is formed at a position corresponding to an inner side of a cylinder body of the half-cylinder body mold, a bolt is formed in the through hole, and the through hole is fixedly connected to the threaded blind hole on the inner side of the cylinder body of the half-cylinder body mold.

* * * * *